United States Patent
Jl (12)

(10) Patent No.: US 7,100,236 B1
(45) Date of Patent: Sep. 5, 2006

(54) BUFFER STRUCTURED CASTOR WHEEL FOR VACUUM CLEANER

(75) Inventor: Heon Pyeong Jl, Pusankwangyok-shi (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/130,215

(22) PCT Filed: Mar. 15, 2000

(86) PCT No.: PCT/KR00/00214

§ 371 (c)(1),
(2), (4) Date: May 14, 2002

(87) PCT Pub. No.: WO01/35807

PCT Pub. Date: May 25, 2001

(30) Foreign Application Priority Data

Nov. 17, 1999 (KR) ......................... 1999-51124

(51) Int. Cl.
*A47L 5/00* (2006.01)
*A47L 9/00* (2006.01)

(52) U.S. Cl. ........................ 15/325; 15/327.2; 15/353
(58) Field of Classification Search ............... 15/325, 15/327.1, 327.2, 327.6, 327.7, 353; 16/18 CG
See application file for complete search history.

(56) References Cited

U.S. PATENT DOCUMENTS

| | | | | |
|---|---|---|---|---|
| 1,888,726 A | * | 11/1932 | Jarvis et al. | 16/18 CG |
| 1,906,590 A | * | 5/1933 | Hewson | 248/345.1 |
| 2,059,348 A | * | 11/1936 | Herold | 16/18 CG |
| 2,290,001 A | * | 7/1942 | Sherman | 248/345.1 |
| 3,166,780 A | * | 1/1965 | Schultz, Jr. | 16/21 |
| 4,509,227 A | * | 4/1985 | Keane | 16/23 |
| 4,547,206 A | * | 10/1985 | Sovis et al. | 96/342 |
| 4,713,859 A | | 12/1987 | Smith, Jr. | 15/264 |
| 5,086,537 A | | 2/1992 | McDowell et al. | 15/353 |
| 5,131,114 A | * | 7/1992 | Sunagawa et al. | 15/323 |
| 5,144,716 A | * | 9/1992 | Watanabe et al. | 15/323 |
| 5,216,778 A | * | 6/1993 | Suzuki et al. | 15/327.1 |
| 5,412,837 A | * | 5/1995 | Worwag | 15/353 |
| 6,070,289 A | * | 6/2000 | Lee et al. | 15/326 |
| 6,145,160 A | * | 11/2000 | Buss et al. | 15/323 |
| 6,418,578 B1 | * | 7/2002 | Polevoy et al. | 5/200.1 |

FOREIGN PATENT DOCUMENTS

| | | |
|---|---|---|
| CN | 2174153 Y | 8/1994 |
| CN | 2177735 Y | 9/1994 |
| JP | 62-184848 | 11/1987 |
| JP | 4-80463 | 7/1992 |

OTHER PUBLICATIONS

CN Office Action dated Apr. 4, 2003 (full text w/ English translation).

* cited by examiner

*Primary Examiner*—Terrence R. Till
(74) *Attorney, Agent, or Firm*—Fleshner & Kim, LLP

(57) ABSTRACT

Buffer structured castor wheel for a vacuum cleaner, which is modified and disposed appropriately for preventing the vacuum cleaner from bitting a wall and the like directly, including two or more than two castor wheel assemblies fitted to a front bottom of a vacuum cleaner body each capable of two axes rotation and having a portion protruded beyond an outline of the vacuum cleaner body.

23 Claims, 3 Drawing Sheets

BUFFER STRUCTURED CASTOR WHEEL FOR VACUUM CLEANER

TECHNICAL FIELD

The present invention relates to a vacuum cleaner, and more particularly to a buffer structured castor wheel for a vacuum cleaner for moving and changing a direction of the vacuum cleaner, which is modified and disposed appropriately for preventing the vacuum cleaner from hitting a wall and the like directly.

BACKGROUND OF THE RELATED ART

In general, in domestic vacuum cleaners there is a canister type vacuum cleaner having a suction nozzle separate from a vacuum cleaner body, and an upright type vacuum cleaner having the suction nozzle integrated with the vacuum cleaner body. The canister type vacuum cleaner has a hand hold formed of a portion of an extension tube and a flexible connection hose having one end connected to the hand hold and the other end connected to the vacuum cleaner body, for holding on the hand hold and pulling the vacuum cleaner body through the connection hose during cleaning. The vacuum cleaner body has roll moving means having wheels fitted to a bottom thereof for smooth movement of the vacuum cleaner body. As show n in FIG. 1. the roll moving means is provided with one pair of rear wheels 3 fitted to both sides of rear of the vacuum cleaner body 1, and a castor wheel assembly 4 fitted to a center of front bottom of the body 1, wherein the rear wheels 3 are adapted to rotate on an axis parallel to a floor, and the castor wheel assembly 4 adapted to be rotatable in two axis direction, a horizontal axis direction and a vertical axis direction with respect to the floor, for easy change of a direction of movement of the vacuum cleaner body. And, as shown in FIG. 2. the castor wheel assembly 4 is provided with a semi-spherical body 4a convex in a bottom side so that the castor wheel assembly 4 rotates around the vertical rotation shaft and rolls over an object smoothly when the castor wheel assembly 4 hits on the object projected from the floor.

However, the related art vacuum cleaner having the roll moving means fitted thereto has a problem in that there are cases occurred frequently when the vacuum cleaner body hits on a wall or furniture as the vacuum cleaner body 1 moves on the floor during cleaning because the vacuum cleaner body can not change direction yet. In this instance, since the related art vacuum cleaner body 1 is provided with no buffering structure on a front surface of the vacuum cleaner body 1, the vacuum cleaner body 1 receives a severe impact when the vacuum cleaner body 1 hits the wall and the like, and when it is serious, a portion of the vacuum cleaner having received the impact is damaged.

DISCLOSURE OF INVENTION

Accordingly, the present invention is directed to a buffer structured castor wheel for a vacuum cleaner that substantially obviates one or more of the problems due to limitations and disadvantages of the related art.

An object of the present invention is to provide a buffer structured castor wheel for a vacuum cleaner which permits free direction change of a vacuum cleaner body, or to prevent the vacuum cleaner body from hitting on a wall or the like in advance, or to buffer an impact of the hitting.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the buffer structured castor wheel for a vacuum cleaner includes two or more than two castor wheel assemblies fitted to a front bottom of a vacuum cleaner body each capable of two axes rotation and having a portion protruded beyond an outline of the vacuum cleaner body.

It is to be understood that both the foregoing general description and the following detailed description are exemplary and explanatory and are intended to provide further explanation of the invention as claimed.

BRIEF DESCRIPTION OF DRAWINGS

The accompanying drawings, which are included to provide a further understanding of the invention and are incorporated in and constitute a part of this specification, illustrate embodiments of the invention and together with the, description serve to explain the principles of the invention:

In the drawings:

FIG. 4A illustrates a disassembled sectional view of a butter structured caster wheel assembly with a mounting structure on a vacuum cleaner body in accordance with a preferred embodiment of the present invention: and.

BEST MODE FOR CARRYING OUT THE INVENTION

Reference will now be made in detail to the preferred embodiments of the present invention, examples of which are illustrated in the accompanying drawings.

Figure 1:
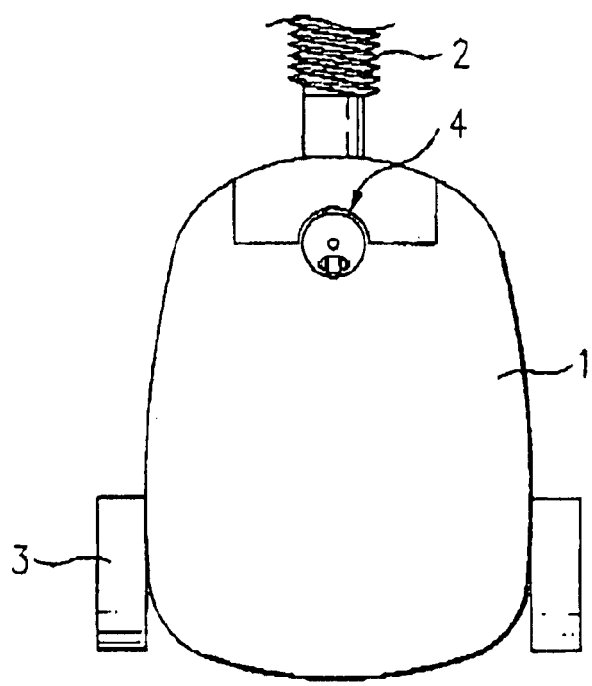
FIG. 1 illustrates a bottom view of a related art vacuum cleaner.
Figure 2:
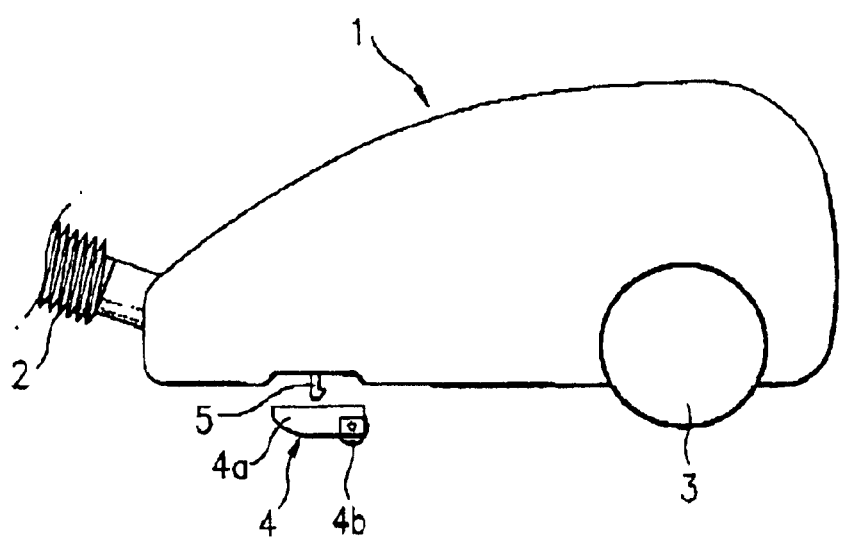
FIG. 2 illustrates a side view of a vacuum cleaner showing a state a castor wheel is separated from a vacuum cleaner body for showing a state the castor wheel in FIG. 1 is assembled to the vacuum cleaner body.
Figure 3:
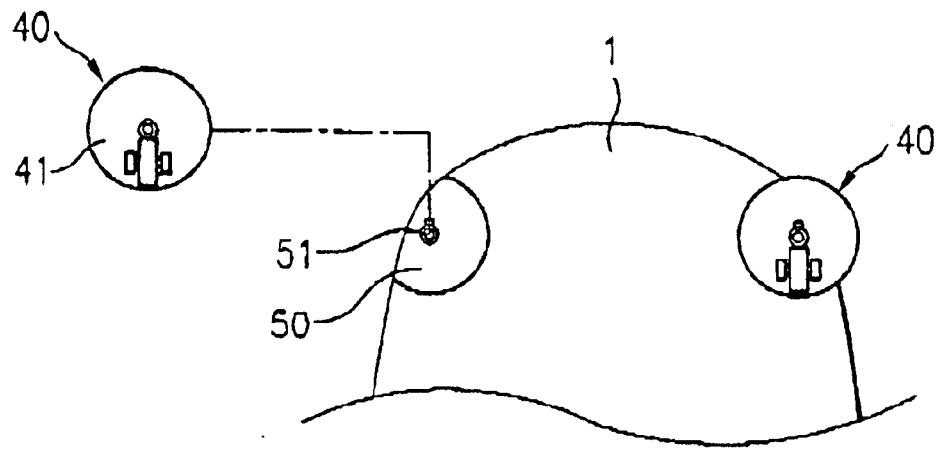
FIG. 3 illustrates a bottom view of a vacuum cleaner having buffer structured castor wheels in accordance with a preferred embodiment of the present invention, wherein one castor wheel assemble is separated from the vacuum cleaner body.

As shown in FIG. 3, there are rear wheels on both sides of rear of a vacuum cleaner body 1 rotatably fitted on an axis parallel to a floor, and two castor wheel assemblies 40 rotatably centered on two axes fitted to both sides of front bottom of the vacuum cleaner body 1. The castor wheel assemblies are fitted such that a portion of each of the castor wheel assemblies 40 protrudes beyond an outline of the vacuum cleaner body 1.

Figure 4A:
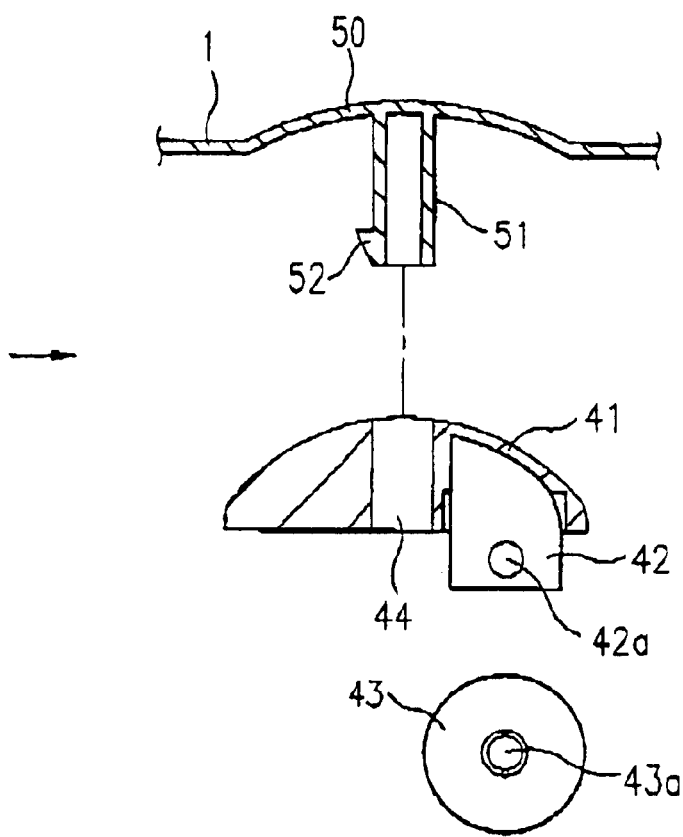
Figure 4B:
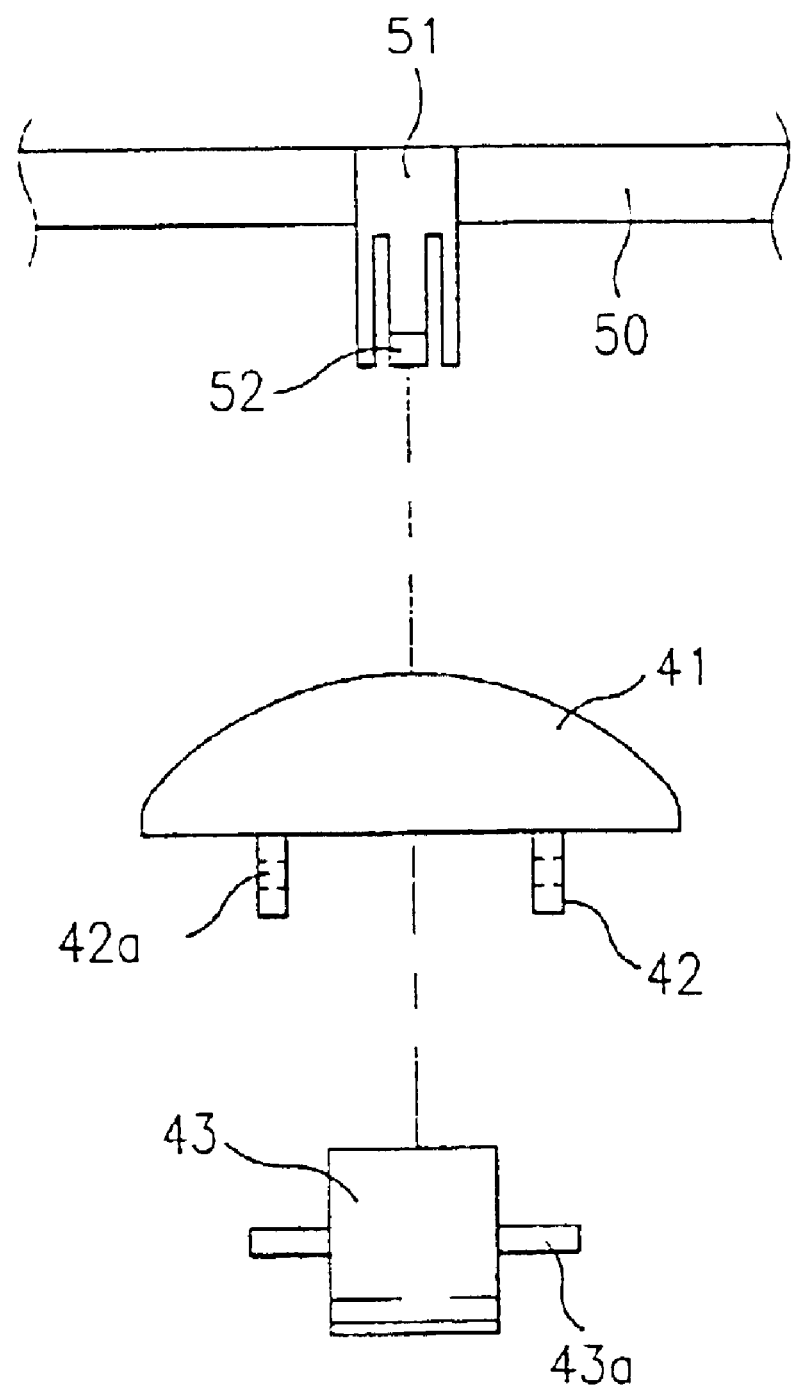
FIG. 4B illustrates a disassembled view of a buffer structured castor wheel assembly seen in a direction of an arrow in FIG. 4A.

As shown in FIGS. 4A and 4B, each castor wheel assembly 40 includes a body 41 having a semispherical top part and a flat bottom part, one pair of fastening brackets 42 on the bottom of the body 41, and a wheel 43 rotatably fitted to the fastening brackets 42. The body 41 of the castor wheel assembly 40 has a pass through hole 44 at a center thereof for coupling to the bottom of the vacuum cleaner body 1, and each of the brackets 42 has a hole 42a for coupling with a wheel 43. And, there is a fitting part 50 in the bottom of the vacuum cleaner body 1 for rotatably fitting the body 41, and a vertical rotation shaft 51 at a center of the fitting part 50, wherein the fitting part 50 is recessed so as to conform to the semi-spherical body 41, and the vertical rotation shaft 51 has a diameter slightly smaller than an inside diameter of the pass through hole 44 in the body 41, to couple the body 41 with the vertical rotation shaft 51 through the pass through hole 44 for permitting rotation of the body 41 around the vertical rotation shaft 51. There is an elastic hook 52 projected in a radial direction at an end of the vertical rotation shaft 51 which is cut on both sides thereof and which passes through the pass through hole 44 in the body 41 together with the vertical rotation shaft 51, and holds the body 41 in place by hooking to and supporting the bottom of the pass through hole 44. That is, when the vertical rotation shaft 51 passes through the pass through hole 44, the elastic hook 52 is pressed by an inside wall of the pass through hole 44 as it slides therethrough, and is restored to an original position by its own elastic force as it leaves the pass through hole 44 to support the bottom end of the pass through hole 44. On the other hand, the wheel 43 which is coupled to the fastening brackets 42 on the body 41 has a horizontal rotation shaft 43a at a center projected to both sides formed as a unit for rotatably coupling to the holes 42a in the fastening brackets 42.

The protruded portion of the castor wheel assembly 40 beyond the outline of the vacuum cleaner body 1 on both sides of front of the vacuum cleaner body 1 causes the protruded portion hits a wall when the vacuum cleaner body 1 approaches to the wall or furniture before the vacuum cleaner body 1 hits on the wall during the user carries out cleaning while the user holds on the hand hold and moves the vacuum cleaner body, thereby preventing the vacuum cleaner body 1 from hitting the wall directly. Particularly, when the protruded portion of the castor wheel assembly 40 approaches to a low gap, such as a gap between the floor and the furniture, the protruded portion enters into the gap, and hits on a bottom of the furniture by the semispherical portion of the body 41 at first, to make the body 41 of the castor wheel assembly 40 to rotate centered on the vertical rotation shaft 51, which changes a direction of the vacuum cleaner body 1, that prevents the vacuum cleaner body 1 from hitting the wall directly, permitting a smooth cleaning.

INDUSTRIAL APPLICABILITY

As has been explained, the buffer structured castor wheel for a vacuum cleaner fitted on both sides of front of a vacuum cleaner body permits a free direction change of the vacuum cleaner body during cleaning. And, since the buffer structured castor wheel hits on a wall at first when the vacuum cleaner comes closer to the wall, acting as a buffer, a direct damage to the vacuum cleaner body can be prevented.

It will be apparent to those skilled in the art that various modifications and variations can be made in the buffer structured castor wheel for a vacuum cleaner of the present invention without departing from the spirit or scope of the invention. Thus, it is intended that the present invention cover the modifications and variations of this invention provided they come within the scope of the appended claims and their equivalents.

What is claimed is:

1. A castor wheel structure for a vacuum cleaner, comprising:
    two or more castor wheel assemblies installed on and fitted to a bottom surface of a forward portion of a vacuum cleaner body, wherein separate portions of each castor wheel assembly of the two or more castor wheel assemblies are configured to rotate about two separate axes, and wherein a portion of a body portion of each castor wheel assembly is configured to extend beyond an outer perimeter of the vacuum cleaner body.

2. The castor wheel structure of claim 1, wherein the body portion of each castor wheel assembly comprises a semi-spherical top portion rotatably coupled to the bottom surface of the vacuum cleaner body by a central rotation shaft extending vertically from the body portion, and wherein each castor wheel assembly comprises a wheel rotatably coupled to a bottom portion of the body portion of each castor wheel assembly so as to be rotatably centered on a horizontal rotation shaft.

3. The castor wheel structure of claim 2, wherein the bottom surface of the vacuum cleaner body to which the body portion of the castor wheel assembly is rotatably coupled comprises a curved surface which corresponds to the semi-spherical top portion of the body portion.

4. The castor wheel structure of claim 3, wherein the central rotation shaft is configured to extend vertically downward from the curved surface of the bottom surface of the vacuum cleaner body and into a corresponding vertical through hole formed in the body portion of the castor wheel assembly.

5. The castor wheel structure of claim 4, wherein the central rotation shaft comprises at least one elastic member configured to engage with a bottom surface of the body portion of the castor wheel assembly so as to support the body portion when the body portion of the castor wheel assembly is installed on the bottom surface of the vacuum cleaner body.

6. The castor wheel structure of claim 5, wherein the castor wheel assembly is configured to rotate about a vertical axis formed by the central rotation shaft when the castor wheel assembly is installed on the bottom surface of the vacuum cleaner body.

7. The castor wheel structure of claim 2, further comprising at least one fastening bracket configured to couple each body portion to a corresponding wheel.

8. The castor wheel structure of claim 7, wherein each wheel further comprises a horizontal rotation shaft extending through the wheel, wherein opposite end portions of the horizontal rotation shaft are configured to extend beyond opposite outer perimeter surfaces of the wheel.

9. The castor wheel structure of claim 8, wherein the opposite end portions of the horizontal rotation shaft are configured to be rotatably coupled to corresponding holes formed in the at least one fastening bracket.

10. A mobile unit, comprising:
    a main body;
    a plurality of castor wheel assemblies installed on a bottom surface of the main body, wherein each of the plurality of castor wheel assemblies comprises a first portion configured to rotate about a horizontal axis, and a second portion configured to rotate about a vertical axis, and wherein a curved portion of each of the plurality of castor wheel assemblies is configured to extend beyond an outer perimeter of the main body so as to cause a change in a rolling direction of the mobile unit when the curved portion of at least one of the plurality of castor wheel assemblies comes into contact with an outside object.

11. The mobile unit of claim 10, wherein each of the plurality of castor wheel assemblies comprises:
    a body portion comprising a top portion;
    a central rotation shaft formed extending vertically downward from a bottom surface of the main body of the mobile unit and configured to rotatably couple the main body of the mobile unit and the body portion;
    a wheel rotatably coupled to a lower portion of the body portion, comprising a horizontal rotation shaft extended therethrough such that opposite ends of the horizontal rotation shaft extend beyond opposite outer perimeter surface of the wheel; and
    a fastener configured to couple the body portion and the wheel.

12. The mobile unit of claim 11, wherein a curved shape of the bottom surface of the main body of the mobile unit corresponds to a semi-spherical shape of the top portion of the body portion of the castor wheel assembly.

13. The mobile unit of claim 11, wherein the body portion of the castor wheel assembly further comprises a vertical through hole configured to receive the central rotation shaft.

14. The mobile unit of claim 13, wherein the central rotation shaft comprises at least one elastic member configured to engage with a bottom surface of the body portion of the castor wheel assembly so as to support the body portion when the body portion of the castor wheel assembly is installed on the bottom surface of the main body.

15. The mobile unit of claim 14, wherein the elastic member comprises an elastic hook.

16. A castor wheel structure, comprising:
two or more castor wheel assemblies fitted to a vacuum cleaner body having a first outline defining a circumferential perimeter of a forward portion of the vacuum cleaner body, wherein each castor wheel assembly includes a wheel rotatable about a horizontal axis of a castor wheel body, and wherein the castor wheel body is rotatable about a vertical axis extending from a bottom surface of the vacuum cleaner body and has a second outline defining a portion of the castor wheel body and protruding beyond the first outline of the vacuum cleaner body.

17. The castor wheel as claimed in claim 16, wherein the castor wheel body of each castor wheel assembly has a semi-spherical top surface fitted to a recess of the bottom surface of the vacuum cleaner body.

18. A vacuum cleaner, comprising:
a main body of a mobile unit; and
at least one castor wheel assembly installed on a bottom surface of the main body, comprising a first portion configured to rotate about a horizontal axis, and a second portion configured to rotate about a vertical axis, and wherein a curved portion of the at least one castor wheel assembly is configured to extend beyond an outer perimeter of the main body so as to cause a change in a rolling direction of the mobile unit when the curved portion comes into contact with an outside object.

19. The vacuum cleaner of claim 18, wherein the at least one castor wheel assembly comprises:
a body portion comprising a top portion;
a central rotation shaft formed extending vertically downward from a bottom surface of the main body of the mobile unit and configured to rotatably couple the main body of the mobile unit and the body portion;
a wheel rotatably coupled to a lower portion of the body portion, comprising a horizontal rotation shaft extended therethrough such that opposite ends of the horizontal rotation shaft extend beyond opposite outer perimeter surface of the wheel; and
a fastener configured to couple the body portion and the wheel.

20. The vacuum cleaner of claim 19, wherein a curved shape of the bottom surface of the main body of the mobile unit corresponds to a semi-spherical shape of the top portion of the body portion of the castor wheel assembly.

21. The vacuum cleaner of claim 19, wherein the body portion of the castor wheel assembly further comprises a vertical through hole configured to receive the central rotation shaft.

22. The vacuum cleaner of claim 21, wherein the central rotation shaft comprises at least one elastic member configured to engage with a bottom surface of the body portion of the castor wheel assembly so as to support the body portion when the body portion of the castor wheel assembly is installed on the bottom surface of the main body.

23. The vacuum cleaner of claim 22, wherein the elastic member comprises an elastic hook.

* * * * *